Figure 1:
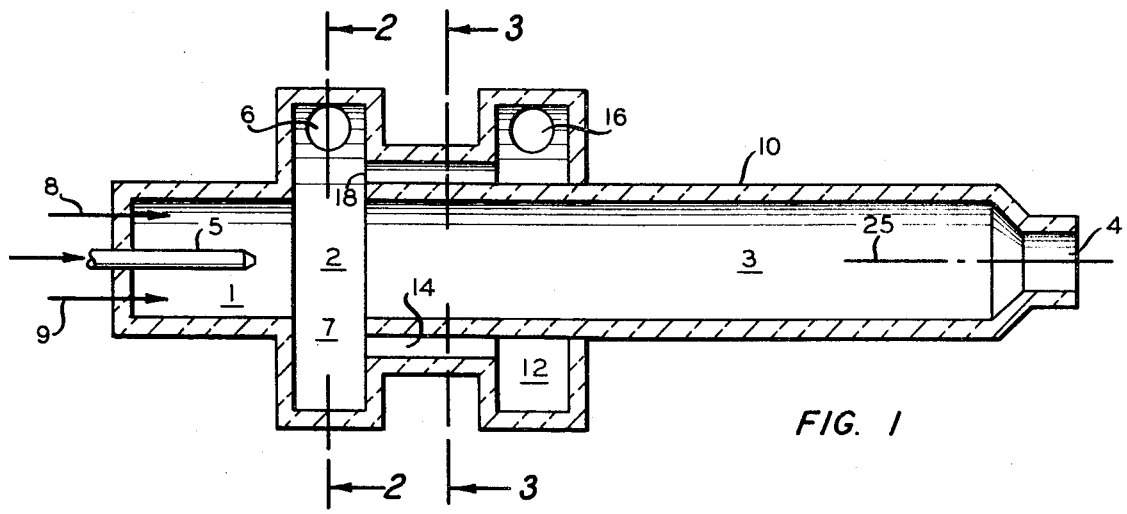

United States Patent

[11] 3,619,138

| [72] | Inventor | Thomas J. Gunnell<br>Bartlesville, Okla. |
|---|---|---|
| [21] | Appl. No. | 793,288 |
| [22] | Filed | Jan. 23, 1969 |
| [45] | Patented | Nov. 9, 1971 |
| [73] | Assignee | Phillips Petroleum Company |

[54] CARBON-BLACK PROCESS
8 Claims, 4 Drawing Figs.

[52] U.S. Cl. .................................................. 23/209.4,
23/259.5
[51] Int. Cl. ..................................................... C09c 1/50
[50] Field of Search .......................................... 23/209.4,
209.6, 259.5, 277

[56] References Cited
UNITED STATES PATENTS

| 2,924,512 | 2/1960 | Webster et al. | 23/259.5 |
| 3,026,185 | 3/1962 | Takewell et al. | 23/259.5 |
| 3,409,410 | 11/1968 | Spence et al. | 23/259.5 X |
| 3,410,660 | 11/1968 | Henderson et al. | 23/209.4 |

*Primary Examiner*—Edward J. Meros
*Attorney*—Young and Quigg

ABSTRACT: A process for the production of carbon-black by the pyrolytic decomposition of a hydrocarbon feed with hot combustion gases introduced through the periphery of the reactor and commingled with an augmenting gas introduced in a direction generally opposite to the axial flow of the hydrocarbon feed through the reactor.

PATENTED NOV 9 1971

3,619,138

INVENTOR.
T. J. GUNNELL

BY
Young & Quigg
ATTORNEYS

CARBON-BLACK PROCESS

This invention pertains to carbon-black.

In one of its more specific aspects, this invention pertains to methods and apparatus for increasing carbon black yields from furnace processes.

One carbon black process employs a carbon-black reactor having a precombustion chamber from which some portion of the oxidant, fuel or reactant hydrocarbon, or combination of these, is introduced through the periphery of that reaction mass flowing axially through the reactor. The axial flow through the reactor is initiated by reactant introduction either in the previous reactant introductory zone, known as the axial zone, or through the precombustion chamber, itself.

The precombustion section is composed of the precombustion chamber and precombustion zone and generally has a diameter larger than that of the preceding axial zone and of that of the subsequent sections of the reactor in order to accommodate introduction of the materials therethrough. Generally, the reaction zone, subsequent to the precombustion zone, is the "carbon formation zone," that is, that zone in which the principal portion of the carbon-black is considered as being formed and from which the carbon-black is recovered.

Introduction of reactants from the precombustion chamber through the periphery of the axial flow through the reactor may be in any relation to that flow, for example, tangentially or radially. It is generally considered that such introduction establishes a mass of gases peripheral to that flow of material along the axial, or longitudinal, centerline of the reactor.

As spoken of hereinafter, without meaning to limit the invention thereto, the reactor will be comprised of an axial zone, a precombustion section comprising the precombustion chamber and precombustion zone, the latter being axially contiguous with the axial zone, and a reaction zone. This designation will be used as a matter of simplifying the discussion and will be further discussed with reference to a drawing which is part of this specification.

It has now been determined that considerable variations in yield and product quality can be effected by introducing reactants into the precombustion chamber in a manner such as to disrupt that flow of materials conventionally introduced from the precombustion chamber into the precombustion zone and into the axial flow through the reactor.

According to the method of this invention, there is provided a process for producing carbon-black in a carbon-black reactor having a precombustion chamber from which reactants are introduced through the periphery of the reactant mass passing axially through the reactor which comprises introducing at least one reactant stream into those gases originating in the precombustion chamber in a direction generally opposite to the direction of the axial flow of the reactant mass through the reactor. Also, in accordance with this invention, there is provided a carbon-black reactor having axial reactant introduction means, a precombustion section and a carbon black recovery zone in axial contiguous alignment to form a reactor having a axial flow path, said precombustion section being adapted for the introduction of reactants therefrom through the periphery of the axial flow path and for the introduction of reactants thereinto in a direction generally opposite to the direction of the axial flow path through the reactor.

In one embodiment of this invention, the introduction of the reactants into the precombustion section will be in a direction directly opposite to the direction of the axial flow of the reactants through the reactor.

In another of the embodiments of this invention, the introduction of the reactants will be in a direction generally countercurrent to the direction of the axial flow of the reactants through the reactor, that is, preferably at an angle up to about 75° from, and generally opposite to, the axial flow of reactants through the reactor.

Accordingly, it is an object of this invention to provide a carbon-black process having improved yields.

It is another object of this invention to provide a carbon-black reactor for producing carbon-black having different properties.

In the practice of this invention, gases are introduced into the precombustion chamber in such a manner as to interfere with that flow of gas generated in the precombustion chamber and flowing into the path of axial flow through the precombustion zone. It has been determined that many individual factors related to such interference have an effect on the process. Generally, such factors included the angle of discharge of these gases, also known as augmenting gases, the number of points of discharge of the augmenting gases into the precombustion chamber from the augmenting chamber in which the augmenting gases are generated, the velocity of the augmenting gases so discharged, the nature of the augmenting gases discharged, especially in respect to their density and chemical characteristics, and the temperature of the augmenting gases.

In respect to the plane of discharge of the augmenting gases considered relative to the axial flow through the reactor, the discharge may be parallel to the axial flow, or a an angle thereto, up to about 75° thereto, preferably from about 15° to about 75° thereto. If angular discharge is employed, discharge will preferably be made at a point between the inner periphery of the entry port of the precombustion chamber and the outer periphery of the axial path through the reactor. Preferably, angular discharge will be made on a plane intersecting the intersection of the longitudinal axes of the reactor and a vertical line positioned about one inch upstream of the inlet to the precombustion zone.

Any suitable method of discharging the augmenting gases from the augmenting chamber into the precombustion chamber can be made. An annulus peripheral to the axial path through the reactor has been found satisfactory, as have a series of individual conduits discharging into the precombustion chamber.

The required velocity of the augmenting gases will depend somewhat upon their nature. Actually, any gas can be used as an augmenting gas, including gases which can be expected to undergo chemical change within the reactor, such as oxygen, hydrogen, combustible hydrocarbons, or gases which would not be expected to undergo reaction, such as carbon dioxide, nitrogen, and the like. Any combination of such gases can be employed. Generally, the greater the density of the augmenting gas, the less will be its required velocity. Similarly, different effects can be affected depending upon the nature of the augmenting gas. If the augmenting gases contain appreciable quantities of combustible materials, their effect will be to lower the structure of the carbon black produced; if they contain appreciable quantities of free oxygen, their effect will be to increase the structure of the carbon black produced.

The temperature and rate at which the augmenting gases are introduced into the precombustion chamber are related in that neither factor should be such that the photelometer of the black is appreciably reduced. Generally, it is preferable to maintain the photelometer above 90 and this is done by avoiding such introduction as will upset the heat balance within the reactor.

The effect of the foregoing factors will be illustrated by the data presented hereinafter.

In the following discussion it is to be understood that any of the feeds, fuels, and oxidants used in conventional processes for producing carbon-black can be employed and that any combination of these materials can be employed in their usual proportions and introduced at any of the conventional introductory points. Similarly, the term "reactant" and "reactant mass" will mean any of the components, or combination thereof, introduced into the reactor, either individually or collectively, for whatever purpose.

Similarly, it will be understood that the process of this invention is conducted under such carbon-black-forming conditions of elevated temperature and of pressure as are normally employed in carbon-black production and as are well known in the art.

Throughout the following discussion, the augmenting gas will be considered as being introduced into the precombustion chamber which is a part of the precombustion section from an augmenting chamber which is an integral part of the reactor. It will be understood, however, that the augmenting gases can be introduced from an extraneous source, not an integral part of the reactor but in open communication therewith.

Similarly, this invention will be explained with reference to drawings, indicating a reactor having a feed introduction zone preceding the precombustion zone. It is to be understood, however, as the data will show, that the process of this invention is applicable to any reactor having the equivalent of a precombustion chamber.

Neither the following discussion nor the drawings are to be considered as limiting the scope of the invention.

Figure 2:
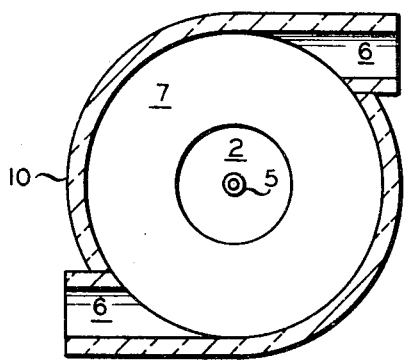
Figure 3:
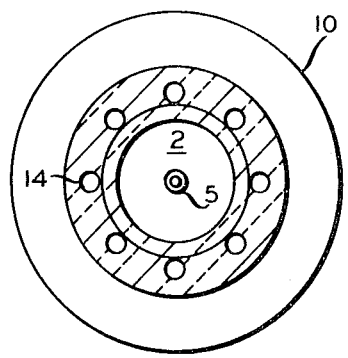

This invention will be more easily understood if explained in conjunction with the attached drawings in which FIG. 1 is a cross-sectional view of the reactor in elevation; FIG. 2 is a cross-sectional view through section 2—2 of FIG. 1; FIG. 3 is a cross-sectional view through section 3—3 of FIG. 1.

Referring now to FIG. 1, there is shown carbon-black reactor 10 having feed introduction, or axial, zone 1, precombustion zone 2 and carbon formation zone 3 from which carbon-black is recovered through outlet conduit 4.

For purposes of clarity the precombustion section which normally is considered as being comprised of zone 2 and zone 7 is spoken of herein as being comprised of precombustion zone 2 and precombustion chamber 7.

Feed introduction zone 1 is equipped with nozzles 5, 8 and 9 through which make-oil, air and fuel, or any combination of these, is introduced. Make-oil nozzle 5 can be positioned to discharge either into zone 1 or into precombustion zone 2. Zone 1, while illustrated schematically, may be of sufficient size and diameter to provide some reaction prior to precombustion zone 2.

Opening into precombustion zone 2 is precombustion chamber 7, the combined diameter being conventionally greater than the diameters of either feed introduction zone 1 or carbon-formation zone 3. Precombustion chamber 7 is adapted with entry ports 6 for the introduction of reactants therethrough into zone 2. Entry ports 6 will be positioned, as shown in FIG. 2, to discharge through the periphery of precombustion zone 2. Radial or tangential discharge may be employed. By such introduction, there is established a mass of reactants in contrast with that mass of reactants entering zone 2 axially from zone 1.

The axial path of flow through the reactor is generally along the horizontal centerline 25 of the reactor, from zone 1 to outlet 4 and may be considered as generally confined to a path approximately the diameter of axial zone 1 and carbon-black-formation zone 3.

Positioned peripherally to the axial path of the flow through the reactor, and discharging in a direction generally opposite to the flow therethrough, are conduit openings 18 of conduits 14 which openly communicate into precombustion chamber 7 and which provide for the introduction of the high velocity gases into precombustion chamber 7 from augmenting chamber 12.

Conduits 14 are positioned peripheral to the axial path through the reactor as shown in FIG. 3. Any number of such conduits can be provided, it being preferable that those provided be evenly spaced circumferentially. In another embodiment, conduits 14 form an annulus which discharges from augmenting chamber 12 into precombustion chamber 7.

The high-velocity gases introduced into precombustion chamber 7 through conduits 14 can originate in a number of ways. For example, they can originate from an extraneous source through a series of apertures in the downstream side of precombustion chamber 7, these apertures being adapted to discharge into precombustion chamber 7 between its inner edge and the inner edge of nozzle 6. Or, the augmenting gases can be introduced from a chamber, such as augmenting chamber 12, which is equipped with ports 16. In this instance, the augmenting gases can be produced by combustion in ports 16, the augmenting gases being introduced through ports 16 into augmenting chamber 12 and from augmenting chamber 12 into precombustion chamber 7 through conduits 14. The augmenting gases introduced into precombustion chamber 7, in a direction generally opposite the direction of flow of reactants from zone 1 to outlet nozzle 4 can be produced from combustion of any of the conventionally employed fuels, such as those introduced into precombustion chamber 7 through ports 6. The quantity of augmenting gas can vary widely, and generally will be from about 10 percent to about 400 percent of that volume of total gases introduced into precombustion chamber 7 through ports 6, depending on the nature of the gases.

Figure 4:
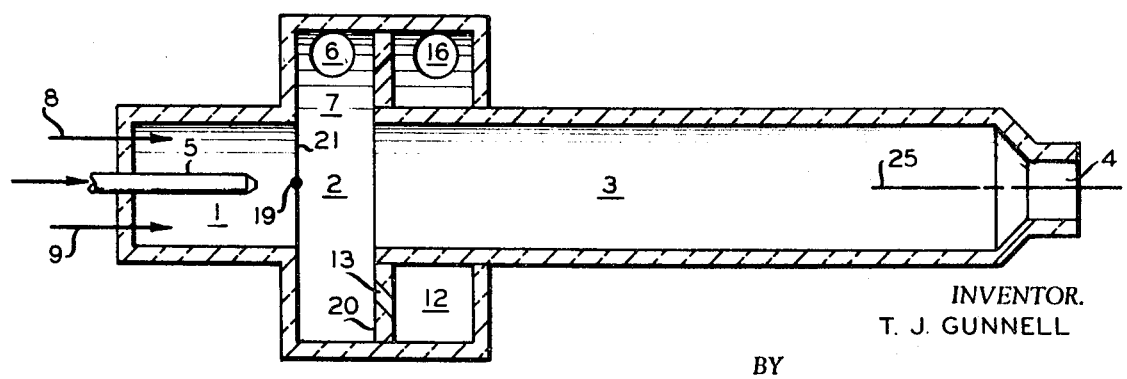

In another embodiment of this invention, the introduction of the augmenting gas is at an angle to the direction of the axial flow through the reactor, the angle of introduction being up to about 75° from the path of axial flow, as generally shown in FIG. 4 in which like numerals refer to similar features in FIG. 1.

In this embodiment, means for introducing the augmenting gases are comparable with those previously described. As shown in FIG. 4, chambers 7 and 12 are integrally formed but separated by wall 20 and discharge from chamber 12 into chamber 7 is through angularly positioned conduits 13, conduits 13 shown forming an angle of about 30° with the axial path of the reactants through the reactor.

Conduits 13 can provide open communications between chamber 12 and chamber 7 by opening through the wall of chamber 7 at the desired angle at any point between the outer periphery of zone 2 and the inner periphery of nozzle 6. It is preferable that conduits 13, when positioned for angular discharge, be positioned to discharge on planes intersecting the axial centerline 25 of the reactor at a point upstream of its point of intersection with inlet 21 of zone 2, this intersection indicated by point 19. While the distance upstream of intersection 19 will be, to some extent, dependent upon the diameter of the reactor, this distance will generally be from about 1 inch to about one-third the diameter of the axial flow path, in inches, upstream of point 19.

As mentioned, the means of introducing the gases into precombustion chamber 7 from augmenting chamber 12 can consist of a plurality of conduits. When employed, they are preferably uniformly spaced around the periphery of the axial path through the reactor, the number varying with the size of the reactor, about four to about 16 being satisfactory. The total area of the openings into the precombustion chamber 7 will be sized to impart to the entering gases a velocity from about 40 to about 1,600 feet per second, preferably from about 75 to about 1,000 feet per second.

In another embodiment, conduits 13 form an annulus which discharges from augmenting chamber 12 into precombustion chamber 7.

The quantity of gases introduced can vary over a wide range, generally from about 10 to about 90 volume percent of the total charge to the reactor The effect of any quantity of gas introduced will vary with the size of the reactor, its particular configuration and other factors.

The method of this invention is illustrated in the series of runs shown in table I. Each series was made in the same reactor, the first zone of which was the precombustion zone, there being no axial zone, feed being introduced into the precombustion zone. The precombustion chamber was equipped with two ports discharging tangentially therefrom through the periphery of the axial flow through the precombustion zone. Augmenting gases were introduced into the precombustion chamber from an augmenting chamber as the products of combustion of propane, through an annulus peripheral to the axial flow. Gases from the annulus entered the precombustion chamber parallel to, but in a direction countercurrent to, the axial flow through the reactor. The annulus was one-fourth inch wide and had a circumference of 4 inches.

In each of the three series of runs, benzene was used as feed. The quantity of gases introduced from the precombustion chamber was maintained constant during each run, the percentage of the total being formed in the precombustion chamber or in the augmenting chamber being varied. In all runs, the quantity of reactants introduced into the precombustion chamber was equally proportional between two inlet ports to the chamber. In all series, the amount of air introduced to produce the augmenting gases was 150 percent of the stoichiometric requirement for combustion of the propane supplied. Results are shown in table I.

An analysis of these data indicates that as the quantity of the augmenting gases increases, the structure of the carbon-black and the yield of carbon-black increase.

There appears to be some indication from these data, particularly at the higher feed rates, that there is a point at which the further quantities of augmenting gases decrease yields and reverse the direction of change in surface area and structure caused by lesser quantities of augmenting gases.

As previously stated, in the above runs, the augmenting gases were introduced through an annulus peripheral to the axial path through the reactor. Another series of runs was made under the conditions previously defined except that a different reactor was employed and the augmenting gases were introduced into the precombustion chamber by means of 16 evenly spaced ½-inch diameter conduits discharging at an angle of 26° into the precombustion chamber on planes intercepting at a point about one inch upstream of the intersection of the longitudinal axis of the reactor and the inlet to the precombustion chamber. Under these conditions, results were as shown in table II.

Under the conditions shown in table II, the velocity of the augmenting gases was approximately 75 feet per second per 1,000 standard cubic feet of gases employed.

The data of table II indicate an increase in yield with increasing proportion of augmenting gases, although the level of yield is lower than for those runs reported in table I.

In the runs of table II, the augmenting gases were formed in substantially equal amounts in the two tunnels of the augmenting chamber. Again, 150 percent of the stoichiometric air requirement was used in all runs except in Run IVa in which hydrogen was introduced and the quantity of air was 75 percent of the stoichiometric requirement.

A series of runs was made in which discharge of the augmenting gas was made through eight evenly spaced one-half inch conduits discharging in angular relationship to the axial flow through the reactor on a plane inclined 26° from the horizontal, the planes intersecting at a point about one inch upstream from the intersection of the longitudinal axis of the reactor with the inlet to the precombustion zone. Results are shown in table III.

In all runs, the augmenting gases were formed in equal quantities within each of the two tunnels of the augmenting chamber, 150 percent of the stoichiometric air required being employed in each.

The above data indicate an effect on yield and black properties with increasing quantities of augmenting gases.

TABLE I

| Run No. | Feed, lbs./hr. | Gases to precombustion chamber s.c.f.h. | | | Augmenting gases, s.c.f.h. | | | $T_1/T_2$ | Aug. gas velocity, ft./sec. | Yield, basis Percent C in— | | lbs./gal. $C_6H_6$ | Carbon black properties | | |
|---|---|---|---|---|---|---|---|---|---|---|---|---|---|---|---|
| | | Air | Propane | Total, $T_1$ | Air | Propane | Total, $T_2$ | | | Feed | Feed and fuel | | Photometer (1) | $N_2SA$, $m^2/g$. (2) | DBP, cc./100 g. (3) |
| Ia | 71.2 | 6,000 | 170.4 | 6,170.4 | 0 | 0 | 0 | 0 | 0 | 52.3 | 42.2 | 3.54 | 90 | 88.7 | 120.4 |
| Ib | 73.5 | 5,000 | 142.0 | 5,142.0 | 1,000 | 28.4 | 1,028.4 | 0.20 | 72 | 54.0 | 43.8 | 3.65 | 87 | 87.9 | 124.0 |
| Ic | 76.9 | 4,000 | 113.6 | 4,113.6 | 2,000 | 56.8 | 2,056.8 | 0.50 | 144 | 57.0 | 46.6 | 3.86 | 88 | 87.9 | 109.6 |
| IIa | 83.7 | 7,000 | 198.8 | 7,198.8 | 0 | 0 | 0 | 0 | 0 | 53.1 | 42.9 | 3.59 | 89 | 87.7 | 121.9 |
| IIb | 87.8 | 5,000 | 142.0 | 5,142.0 | 2,000 | 56.8 | 2,056.8 | 0.40 | 144 | 56.2 | 45.8 | 3.81 | 97 | 83.7 | 116.4 |
| IIc | 84.0 | 4,000 | 113.6 | 4,113.6 | 3,000 | 85.2 | 3,085.2 | 0.75 | 216 | 54.8 | 44.2 | 3.71 | 90 | 89.8 | 111.3 |
| IIIa | 88.6 | 8,000 | 227.0 | 8,227.0 | 0 | 0 | 0 | 0 | 0 | 49.8 | 39.5 | 3.37 | 96 | 92.0 | 118.9 |
| IIIb | 97.3 | 7,000 | 199.0 | 7,199.0 | 1,000 | 28.4 | 1,028.4 | 0.14 | 72 | 56.2 | 45.5 | 3.80 | 93 | 78.8 | 110.8 |
| IIIc | 100.8 | 6,000 | 170.4 | 6,170.4 | 2,000 | 56.8 | 2,056.8 | 0.33 | 144 | 57.6 | 47.0 | 3.90 | 93 | 78.2 | 111.1 |
| IIId | 95.8 | 4,000 | 113.6 | 4,113.6 | 4,000 | 113.6 | 4,113.6 | 1 | 288 | 53.5 | 43.2 | 3.62 | 88 | 92.6 | 118.8 |

(1) Per ASTM D-1618-58T.
(2) Surface area per BET Method (modified).
(3) Structure, per ASTM D-2414-65T.

TABLE II

| Run No. | Feed, lbs./hr. | Gases to precombustion chamber s.c.f.h. | | | Augmenting gases, s.c.f.h. | | | $T_2/T_1$ | Aug. gas velocity, ft./sec. | Yield, basis Percent C in— | | lbs./gal. $C_6H_6$ | Carbon black properties | | |
|---|---|---|---|---|---|---|---|---|---|---|---|---|---|---|---|
| | | Air | Propane | Total, $T_1$ | Air | Propane | Total, $T_2$ | | | Feed | Feed and Fuel | | Photometer | $N_2SA$, $m_2/g$. | DBP, cc./100 g. |
| IVa | 53.8 | 6,000 | 170.4 | 6,170.4 | ¹ 600/600 | 34.1 | 1,234.1 | 0.2 | 71 | 44.2 | 31.9 | 2.76 | 93 | 128.1 | 124.8 |
| IVb | 60.8 | 6,000 | 170.4 | 6,170.4 | 0 | 0 | 0 | 0 | 0 | 44.9 | 35.0 | 3.04 | 91 | 113.8 | 124.5 |
| IVc | 61.2 | 6,000 | 170.4 | 6,170.4 | 0 | 0 | 0 | 0 | 0 | 44.6 | 34.8 | 3.02 | 93 | 116.2 | 127.2 |
| IVd | 64.0 | 5,000 | 142 | 5,142 | 1,000 | 28.4 | 1,028.4 | 0.2 | 76 | 47.7 | 37.6 | 3.24 | 90 | 113.9 | 132.3 |
| IVe | 68.7 | 4,000 | 113.6 | 4,113.6 | 2,000 | 56.8 | 2,056.8 | 0.5 | 152 | 49.2 | 39.3 | 3.33 | 94 | 115.7 | 139.0 |
| IVf | 65.1 | 3,000 | 85.2 | 3,085.2 | 3,000 | 85.2 | 3,085.2 | 1 | 228 | 49.3 | 39.0 | 3.34 | 92 | 112.0 | 126.9 |
| IVg | 77.5 | 8,000 | 227.0 | 8,227.0 | 0 | 0 | 0 | 0 | 0 | 43.3 | 33.3 | 2.92 | 94 | 129.0 | 125.5 |
| IVh | 84.0 | 6,000 | 170.4 | 6,170.4 | 2,000 | 56.8 | 2,056.8 | 0.33 | 152 | 46.3 | 36.4 | 3.13 | 91 | 125.0 | 131.7 |

¹ 600 cubic feet of air and 600 cubic feet of hydrogen.

TABLE III

| Run No. | Feed, lbs./hr. | Gases to precombustion chamber s.c.f.h | | | Augmenting gases, s c.f.h. | | | $T_2/T_1$ | Aug. gas velocity, ft./sec. | Yield, basis Percent C in— | | lbs./gal. $C_6H_6$ | Carbon black properties | | |
|---|---|---|---|---|---|---|---|---|---|---|---|---|---|---|---|
| | | Air | Propane | Total, $T_1$ | Air | Propane | Total, $T_2$ | | | Feed | Feed and Fuel | | Photometer | $N_2SA$, $m_2/g$. | DBP, cc./100 g. |
| Va | 61.6 | 5,000 | 142.0 | 5,142.0 | 1,000 | 28.4 | 1,028.4 | 0.2 | 152 | 48.4 | 37.9 | 3.28 | 88 | 114.0 | 129.3 |
| Vb | 62.0 | 4,000 | 113.6 | 4,113.6 | 2,000 | 56.8 | 2,056.8 | 0.5 | 304 | 47.1 | 36.9 | 3.19 | 88 | 109.0 | 125.2 |
| Vc | 60.8 | 4,000 | 113.6 | 4,113.6 | 2,000 | 56.8 | 2,056.8 | 0.5 | 304 | 47.9 | 37.4 | 3.24 | 92 | 117.0 | 126.1 |
| Vd | 63.7 | 3,000 | 85.2 | 3,085.2 | 3,000 | 85.2 | 3,085.2 | 1 | 456 | 49.5 | 39.0 | 3.35 | 89 | 106.7 | 123.3 |

Two additional runs were made to illustrate the effect of employing unbalanced stoichiometry in the formation of the augmenting gases. These runs are shown in table IV.

TABLE IV

| Run No. | Feed, lb./hr. | Gases to precombustion chamber, s.c.f.h. | | | Augmenting gases, s.c.f.h. | | | $T_2/T_1$ | Aug. bus velocity, ft./sec. |
|---|---|---|---|---|---|---|---|---|---|
| | | Air | Propane | Total, $T_1$ | Air | Propane | Total, $T_2$ | | |
| VIa | 62.4 | 5,000 | 113.6 | 5,113.6 | 1,000 | 56.8 | 1,056.8 | 0.2 | 72 |
| VIb | 64.7 | 4,000 | 136.4 | 4,136.4 | 2,000 | 34.0 | 2,034.0 | 0.5 | 304 |
| VIc | 54.7 | 4,000 | 170.4 | 4,170.4 | 2,000 | 56.8 | 2,056.8 | 0.5 | 304 |

| Run No. | Yield, basis | | Carbon black properties | | | Chamber stoichiometry, percent of theoretical | | |
|---|---|---|---|---|---|---|---|---|
| | Percent C in— | | | | | | | |
| | Feed | Feed and fuel | Lbs./gal. $C_6H_6$ | Photelometer | $N_2SA$, m.²/g. | DBP, cc./100 g. | Precombustion | Augmenting | Overall |
| VIa | 48.2 | 37.8 | 3.26 | 91 | 116.1 | 115.6 | 187 | 75 | 150 |
| VIb | 49.7 | 39.2 | 3.36 | 91 | 113.3 | 136.7 | 125 | ¹ 250 | 150 |
| VIc | 52.7 | 37.1 | 3.57 | 91 | 117.4 | 126.7 | ² 100 | 150 | 113 |

¹ One augmenting tunnel at 150%, the other at 760%.
² One precombustion tunnel at 75%, the other at 150%.

Run VIa was run with precombustion gas formed with 187 percent of the stoichiometric air requirement and the augmenting gases were formed with 75 percent of the stoichiometric air requirement, for an overall percentage of 150.

Run VIb was run at respective values of 125 percent and 250 percent, for an overall percentage of 150. Run VIc was run at respective values of 100 percent and 150 percent, for an overall percentage of 113. The 250 percent of stoichiometry of Run VIb was attained by operating one of the ports of the combustion chamber at 150 percent of stoichiometry and the other at 760 percent of stoichiometry.

In Run VIc, the 100 percent of stoichiometry in the precombustion chamber was attained by operating one of its ports at 75 percent of stoichiometry and the other at 150 percent of stoichiometry.

It will be seen from the above that various modifications can be made to the above process. However, such are considered as being within the scope of the invention.

What is claimed is:

1. A process for the production of carbon-black by the pyrolytic decomposition of a hydrocarbon feed by bringing said hydrocarbon feed to its carbon-black-forming temperature by contacting said hydrocarbon feed with hot combustion gases produced by the oxidation of a fuel with a free oxygen-containing gas which comprises:
   a. introducing said hydrocarbon feed into a reactor;
   b. introducing hot combustion gases through the periphery of said reactor;
   c. introducing an augmenting gas selected from the group consisting of oxygen, hydrogen, combustible hydrocarbon, carbon dioxide, hot combustion gases and nitrogen into commingled relationship with said hot combustion gases, said gas being introduced in a quantity and at a velocity sufficient to affect the structure of the carbon-black produced in a after-defined carbon-black-forming zone, said gas being introduced into said hot combustion gases in a direction generally countercurrent to the direction of axial flow of said hydrocarbon feed through said reactor;
   d. passing the gaseous mixture from step (c) into contact with said hydrocarbon feed to bring said hydrocarbon feed to carbon-black-forming conditions; and,
   e. passing said hydrocarbon feed into a carbon-black-forming zone to produce carbon-black.

2. The process of claim 1 in which said augmenting gas is introduced into commingled relationship with said hot combustion gases at an angle of up to 75° from the axial flow of said hydrocarbon feed through said reactor.

3. The process of claim 1 in which said augmenting gas is introduced into commingled relationship with said hot combustion gases in an amount from about 10 percent to about 400 percent of the volume of said hot combustion gases.

4. The process of claim 1 in which said augmenting gas is introduced into commingled relationship with said hot combustion gases at a velocity within the range of about 40 to about 1,600 feet per second.

5. The process of claim 1 in which said augmenting gas is introduced into commingled relationship with said hot combustion gases in an amount within the range of about 10 to about 90 volume percent of the total volume of reactants introduced into said reactor.

6. The process of claim 1 in which said augmenting gas comprises hot combustion gases produced by the combustion of a combustible hydrocarbon, said gas containing a quantity of said combustible hydrocarbon sufficient to decrease the structure of carbon-black from that structure of carbon-black produced in the absence of said gas.

7. The process of claim 1 in which said augmenting gas comprised hot combustion gases, said gas containing a quantity of free oxygen sufficient to increase the structure of carbon-black over that structure of carbon-black produced in the absence of said gas.

8. The process of claim 1 in which said augmenting gas is introduced into commingled relationship with said hot combustion gases at a plurality of loci within a single zone.

* * * * *